No. 688,710. Patented Dec. 10, 1901.
W. B. SNYDER.
HANDLE FOR DRIVING REINS.
(Application filed Mar. 12, 1901.)
(No Model.)
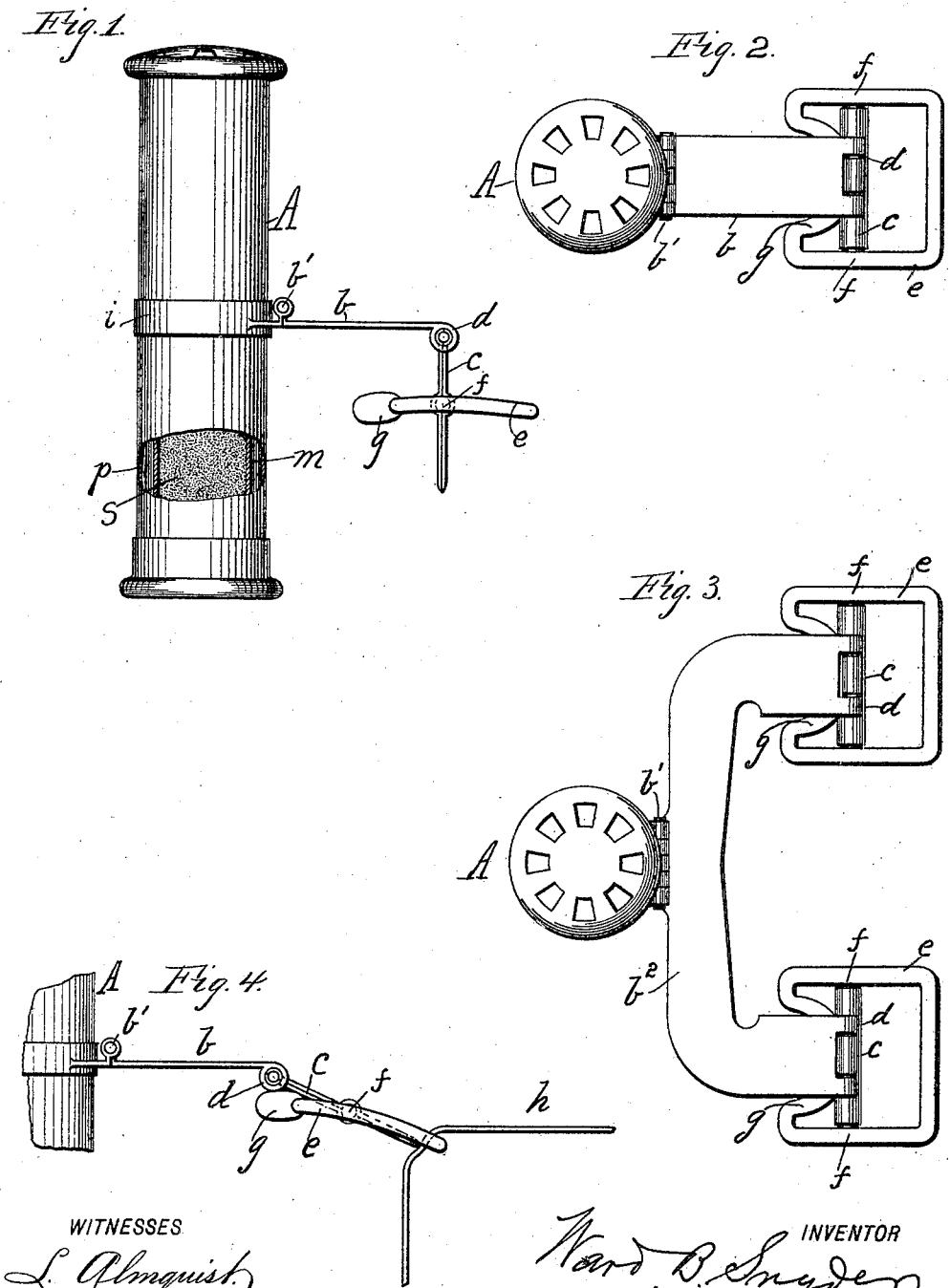
WITNESSES
L. Almquist
J. M. Howard
INVENTOR
Ward B. Snyder
BY
A. O. Thayer
ATTORNEY

UNITED STATES PATENT OFFICE.

WARD B. SNYDER, OF FRENAU, NEW JERSEY, ASSIGNOR OF ONE-HALF TO HARVEY T. ANDREWS, OF NEW YORK, N. Y.

HANDLE FOR DRIVING-REINS.

SPECIFICATION forming part of Letters Patent No. 688,710, dated December 10, 1901.

Application filed March 12, 1901. Serial No. 50,808. (No model.)

*To all whom it may concern:*

Be it known that I, WARD B. SNYDER, a citizen of the United States of America, and a resident of Frenau, county of Monmouth, and State of New Jersey, have invented certain new and useful Improvements in Handles for Driving-Reins and other Objects and Devices, of which the following is a specification.

My invention consists of a handle of round or approximately round form and about as long as the breadth of the hand, having a rein or line attaching device projecting from one side about the middle of the length of the handle suitably to extend between the middle fingers when the handle is gripped in the hand, so that, having the line attached, an efficient rein-holder is provided, and being tubular and adapted for having a suitable carbon-fuel holder inserted and provided with air-circulating passages, which afford a hand-warming driving-handle, of great advantage to drivers, when the fuel, such as compressed carbon, is ignited, which affords slow and long-continued combustion.

My invention also consists of an improvement adapting a single handle for holding two driving-reins in a manner facilitating the guiding of the horse or horses by one hand; also, of an improvement in the rein-attaching clamp affording ready connection of the reins, as hereinafter described, reference being made to the accompanying drawings, in which—

Figure 1 is a side elevation of my improved handle with a part of the shell broken out. Fig. 2 is a top view. Fig. 3 is a top view of the handle adapted for holding two reins in a manner facilitating the guiding of the horse or horses with one hand. Fig. 4 is a side view of part of the handle with a rein attached.

A represents the cylindrical shell of the handle, which is of suitable length and size to be grasped in the hand, so as to be held conveniently and firmly for driving or carrying purposes.

$b$ represents a thin rein-attaching plate projecting laterally from one side of the handle at the middle or thereabout, with its flatwise plane at right angles to the lengthwise direction of the handle, so that it will extend between two of the fingers of the hand in which the handle is grasped without discomfort to the hand, said plate being hinged to the handle at $b'$ to fold for conveniently carrying the handle in the pocket when not in use, and it is to be noted that the plate folds upward only, so that it will be positively supported in a lateral projection when in use. At the extremity of this attaching-plate is an automatic rein-clamp consisting of the tongue-piece $c$, pivoted at $d$ to the plate, and the buckle-frame $e$, pivoted at $f$ to the tongue-piece, and having the counterweighted side $g$ to balance the frame and hold it level while the tongue hangs vertically, and thus opens the clamp and facilitates inserting the rein $h$ in the buckle for connecting it, the holder being held in one hand and the end of the rein being passed through the frame by the other hand. The rein-clamp jointed to the holder at the extremity of the attaching-plate not only affords the pivot of the tongue-piece, but the joint is an essential means of relief of the hand from the up and down thrusts to which the reins are subject from the action of the horses, said thrusts being largely dissipated by the joint, which is thus an essential element of the claims. The rein $h$ being thus inserted and bearing on the extremity of the buckle-frame and also having contact with the extremity of the tongue $c$, a slight pull on the handle brings the parts into the gripping position represented in Fig. 4 and clamps the rein securely.

The buckle-frame is made with ample space between the tongue-pivot and the extremity on which the rein is clamped for admitting two reins to connect both to one handle, which is feasible for enabling both reins to be held with one hand, as sometimes preferred; but I also provide for holding both reins with one hand in a way whereby they may be pulled separately for guiding the horse, this being accomplished by providing the branched attaching-plate $b^2$ with a rein-clamp at the extremity of each branch, as represented in Fig. 3, whereby the two reins may be connected at such distance apart that one will be slackened and the other pulled more tightly simply by turning the hand so as to swing the clamps a little on the axis of the handle.

In Fig. 1 I have represented the attacher as connected to the shell A by a ring $i$, fitted around the shell A and secured in any approved way, as by brazing; but said attacher may be connected in any approved way.

For the burner to warm the handle in cold weather I employ a cylinder $m$, of finely reticulated or perforated material of smaller diameter than the diameter of the shell A, with tubular end flanges, adapted to center the burner in the shell with an annular air-space $p$ between the burner and the shell, to which air is admitted freely through perforations at the bottom, so as to flow upward to the level of the fire within the burner and enter thereat through the perforations of the burner, said burner being filled to its top or thereabout with carbon $s$, preferably compressed in a solid mass, and the upper end of the shell is closed with a suitably-perforated top over which is a perforated cap affording draft-openings to facilitate combustion; but the construction of the burner is described and claimed in an application filed at the same time with this for a patent thereon and need not be more particularly described herein.

An essential feature of my improved rein-holder is the arrangement of rein-attacher to hold the rein flatwise in a plane at right angles to the longitudinal axis of the holder, whereby the holders may be held upright, or nearly so, in the hands, in which they may be so held more naturally and easier to the hands than when the attachers are such that the holders must be held horizontally.

What I claim as my invention is—

1. The improved rein-holder consisting of a handle-piece of substantially cylindrical form, a rein-attaching plate connected to and projecting sidewise from said handle-piece, and a rein-holding clamp comprising a tongue-piece and buckle-frame pivoted to the extremity of the plate, said plate having its flat plane at right angles to the longitudinal axis of the handle-piece and the attacher adapted to hold the rein flatwise in a plane at right angles to the longitudinal axis of the holder, substantially as shown.

2. A rein-holding handle that is adapted to be held vertically in the hand, combined with a plate or rein-attacher that is secured thereto, and rein-holding devices attached to the outer ends of the plate; the plane of the plate extending at right angles to the vertical axis of the handle, and the outer end of the plate being branched so that a plurality of reins may be attached thereto, and be held flatwise in the plane of the divergent branches, substantially as described.

3. In a rein-holder, a buckle-tongue loosely pivoted at its upper end to a support, so as to hang vertically therefrom, combined with a buckle-frame that is weighted at one end, and pivoted upon the tongue at a point to one side of the center of the frame so that the tongue will hang vertically from its support and the frame will normally rest horizontally at about a right angle to the tongue and thus be always ready for the end of the rein to be dropped through it from above, substantially as described.

4. The improved rein-holder consisting of a handle-piece of substantially cylindrical form, a rein-attaching plate connected to and projecting sidewise from said handle-piece, and a rein-holding device pivoted to the extremity of the plate, said plate having its flat plane at right angles to the longitudinal axis of the handle-piece and the attacher adapted to hold the rein flatwise in a plane at right angles to the longitudinal axis of the holder, and said plate hinged to the handle-piece by a joint adapted to positively hold said plate in a laterally-projecting position when the holder is in use.

Signed by me at New York city this 8th day of March, 1901.

WARD B. SNYDER.

Witnesses:
C. SEDGWICK,
A. P. THAYER.